[11] 3,547,101

| [72] | Inventor | Peter J. Rosauer |
| | | Mount Prospect, Ill. |
| [21] | Appl. No. | 640,953 |
| [22] | Filed | May 24, 1967 |
| [45] | Patented | Dec. 15, 1970 |
| [73] | Assignee | Magnaflux Corporation |
| | | Chicago, Ill. |
| | | a corporation of Delaware |

[54] MEDICAL ULTRASONIC DIAGNOSTIC SYSTEM
3 Claims, 7 Drawing Figs.

[52] U.S. Cl. ......................................................... 128/2
[51] Int. Cl. ........................................................... A61b 5/00
[50] Field of Search ............................................. 128/2,
  24.05; 73/71.5, 67.8; 250/54—58

[56] References Cited
UNITED STATES PATENTS

| 2,898,471 | 8/1959 | Kizaur | 250/54 |
| 3,086,390 | 4/1963 | Brown | 73/67.8 |
| 3,220,404 | 11/1965 | Del Lucchese | 128/2.05 |
| 3,291,985 | 12/1966 | Graves et al. | 250/57X |
| 3,308,652 | 3/1967 | Appel et al. | 73/71.5 |

*Primary Examiner*—William E. Kamm
*Attorney*—Hill, Sherman, Meroni, Gross & Simpson ABSTRACT: Medical ultrasonic system in which an ultrasonic transducer is oscillated about an axis aligned with an end face engaged with a body surface, with a sector scan indication being produced on an oscilloscope. The transducer is journaled by bearing means on a support movable transversely relative to the body surface, carried by a second support movable in a direction parallel to the body surface and preferably supported from a support plate disposable in a palpation diaphragm guideway of X-ray apparatus. Drive motor and resolver means are supported on a third support movable relative to the second support in the same direction with an elongated interconnecting member and with belt and pulley drive transmission means, the drive motor and resolver being spaced away from the transducer and the weight thereof being carried independently. Preferably, the transducer is counter balanced.

INVENTOR
PETER J. ROSAUER

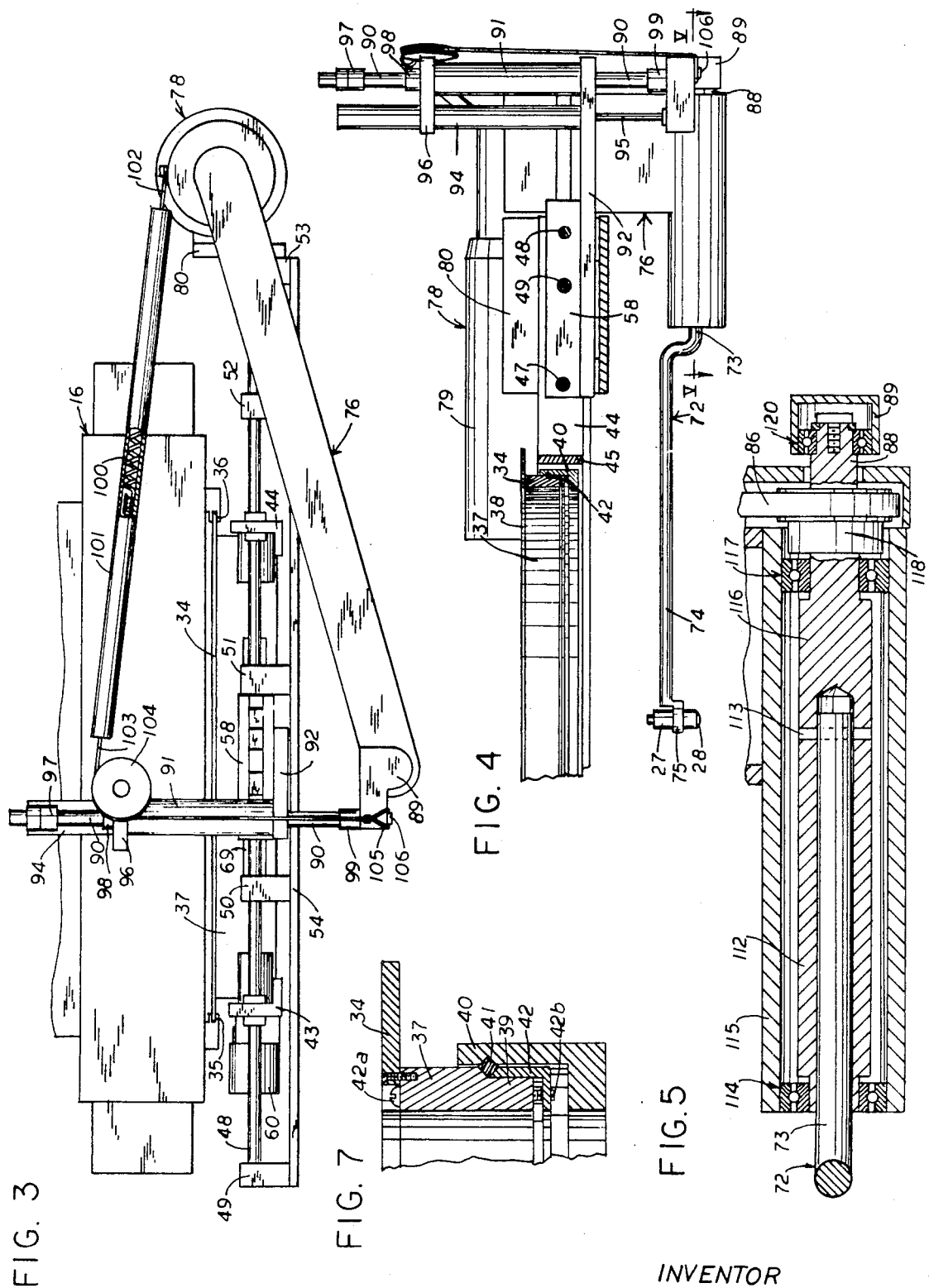

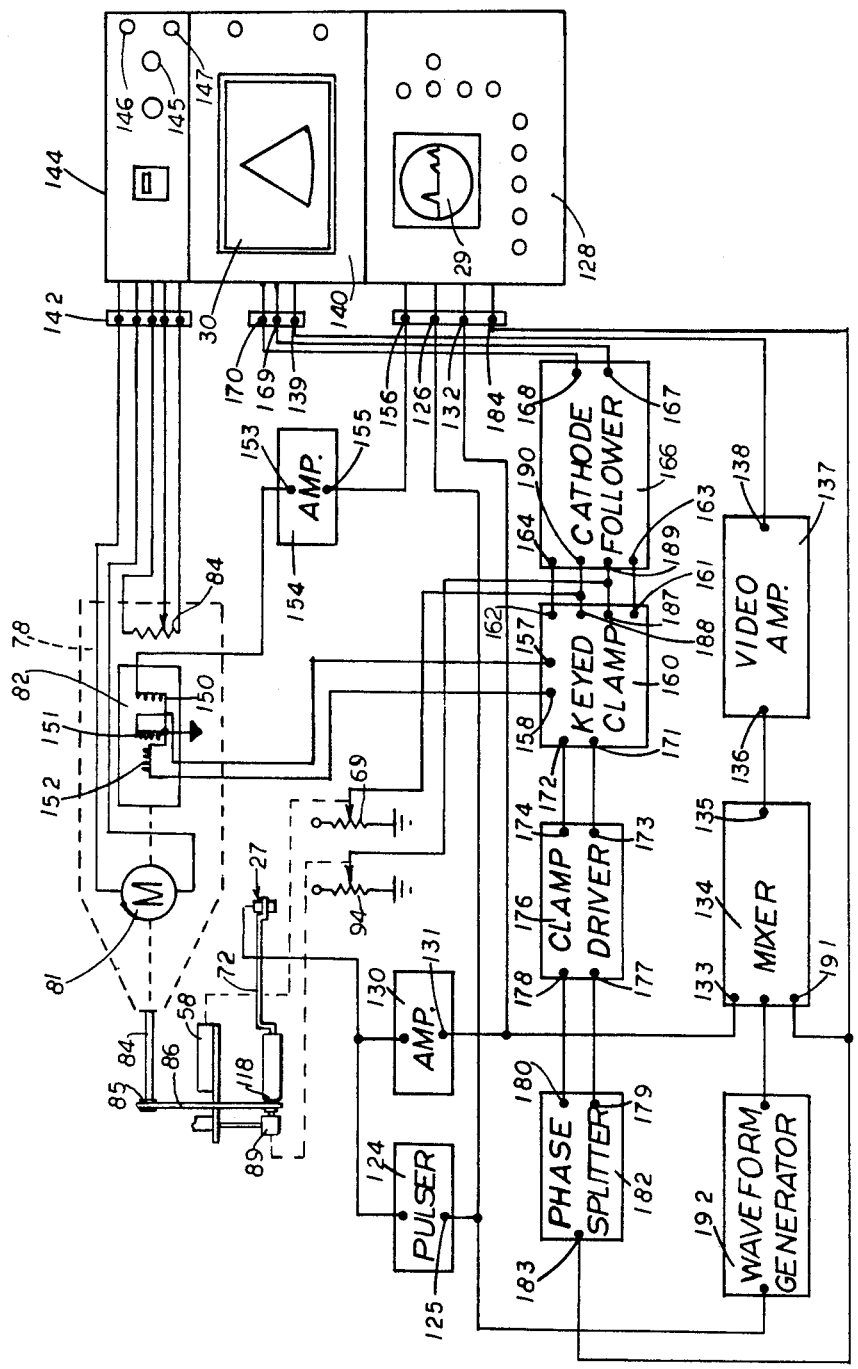

MEDICAL ULTRASONIC DIAGNOSTIC SYSTEM

This invention relates to a medical ultrasonic system and more particularly to a system by which probe means can be readily moved over a surface portion of a patient's body to obtain an accurate and readily interpreted imitation of the position and character of structures within the patient's body and to facilitate a reliable diagnosis of internal conditions. The system of this invention is particularly advantageous in that the probe means can be easily and rapidly moved over a surface portion of the patient's body while maintaining an efficient acoustic coupling to the body and also in that the examining physician can move the probed means to any desired point and hold the probe means in a fixed position while observing the indications obtained at that position. An additional advantage is that the system is operable with minimum discomfort to the patient.

In recent years, medical ultrasonic systems have been developed which provide information with respect to internal bodily conditions which cannot be obtained through the use of X-ray or other testing methods. In general, the operation of such medical ultrasonic systems is based upon the fact that internal bodily tissues affect the transmission of ultrasonic waves and the fact that interfaces between tissues of differing acoustical impedances produce detectable reflections of the waves. The ultrasonic waves can be effectively used at a low power level, far below that at which damage to tissues might occur, and in this respect they provide an important advantage over systems using radiant energy, such as X-ray systems.

One very important development has been in a system employing a "B-scan" operation to produce a cross-sectional pattern upon the face or screen of a cathode ray tube. In one highly advantageous system, a sector scan operation is used wherein the transducer is oscillated about an axis in approximate alignment with an end face thereof used for transmitting and receiving the ultrasonic waves.

Another important development has been in the provision of a system in which scanning movements are effected at a rapid rate, by which it is possible to obtain a visible indication of moving reflecting surfaces without flicker. Thus a moving organ such as the heart, for example, can be much more readily examined.

Still another important development has been in the combination of an ultrasonic system with an X-ray system in a manner to permit observation of indications from both systems at the same time, so as to permit the examining physician to correlate the tests and to obtain a reliable diagnosis.

Although such prior developments are extremely important, the systems have had limitations, particularly with respect to obtaining the desired positioning and movement of ultrasonic probe means over a surface portion of a patient's body. Difficulties have been experienced with respect to the effort required to move the probe means or accurately position the same, with respect to maintaining efficient and uniform acoustic coupling to the patient's body, and also with respect to discomforts to the patient during the examining operation.

This invention was evolved with the general object of improving upon the medical ultrasonic systems heretofore developed and of providing a system wherein ultrasonic probe means can be readily moved over a surface portion of a patient's body and placed in a desired position, with minimum discomfort to the patient during the examining operation.

A further object of the invention is to provide a system which is highly reliable and trouble-free in operation and which is rugged and capable of withstanding substantial abuse.

A further object of the invention is to provide a system in which indications are obtained which are extremely accurate as well as being readily interpreted.

According to this invention, a test assembly is provided including a first support means arranged for positioning in generally fixed relation to a patient's body, the first support means being preferably supported on a carrier of X-ray fluoroscopic apparatus including an examining table on which the patient is supported. The second support means are supported on the first support means for movement in a plane generally parallel to a surface portion of the patient's body and probe means are supported on the second support means by means of a third support means which permits substantially free movement of the probe means in a direction generally transverse to the plane of movement of the second support means. This arrangement facilitates engagement of the probe means with the surface portion of the patient's body during movement of the second support means while accommodating variations in the spacing between the surface portion of the patient's body and the plane of movement of the second support means. In this way, efficient acoustic coupling can be obtained through effectively direct contact with the patient's body, regardless of movement and changes in position of the probe means.

The plane of movement of the second support means can be vertical with the probe means being freely movable in a horizontal direction. In the alternative, the plane of movement can be generally horizontal with the direction of free movement of the probe means being vertical in which case a further feature of the invention may be employed, wherein the third support means includes counterbalance means connected to the probe means to minimize the force required to move the probe means upwardly.

According to a specific feature of the invention, the third support means includes bearing means which supports the probe means for oscillatory movement about an axis generally parallel to and in proximity to the surface of the patient's body. Preferably, the third support means further includes a stator structure with a rotor structure journaled therewithin, coupled to the probe means. With the oscillatory movement of the probe means, a sector scan indication can be readily obtained and in accordance with a further specific feature, resolver means are provided for developing electrical signals indicating the angular position of the rotor structure relative to the stator structure.

Still another feature of the invention is in the provision of means for maintaining the stator and rotor structures at fixed angles with respect to the second support means and the probe means, respectively, to obtain highly accurate operation.

Another important feature of the invention relates to the positioning of the rotor and stator structures a substantial distance away from the prove means. This feature is highly advantageous in that the rotor and stator structures are generally quite bulky, particularly when associated with electric motor and resolver means and by positioning the same away from the probe means, the engagement of the probe means with the patient's body and the movement thereof over the patient's body is greatly facilitated.

A further very important feature of the invention relates to a belt and pulley arrangement for coupling the rotor structure to the probe means. The arrangement is such that a constant angular relationship is maintained to obtain accurate indications, and it is also such as to permit rectilinear movement of the probe means toward and away from the plane of movement of the second support means.

Another important feature of the invention relates to the provision of an assembly which can be mounted on conventional X-ray apparatus, with the assembly including a support plate arranged for disposition in a palpation diaphragm guideway of the X-ray apparatus.

Additional important features of the invention relate to features through which an accurate "B-scan" or cross-sectional indication can be obtained while the probe means is moved over the patient's body.

This invention contemplates other objects, features and advantages which will become more fully apparent from the following detailed description taken in conjunction with the accompanying drawings which illustrate a preferred embodiment and in which:

FIG. 3 is a front elevational view of the probe assembly shown in FIG. 2;

FIG. 4 is a sectional view taken substantially along line IV–IV of FIG. 2;

FIG. 5 is a cross-sectional view on an enlarged scale, taken substantially along line V–V of FIG. 4;

FIG. 6 is a schematic block diagram of electrical and electronic portions of the system; and FIG. 7 is a cross-sectional view on an enlarged scale taken substantially along line VII–VII of FIG. 2.

Figure 1:
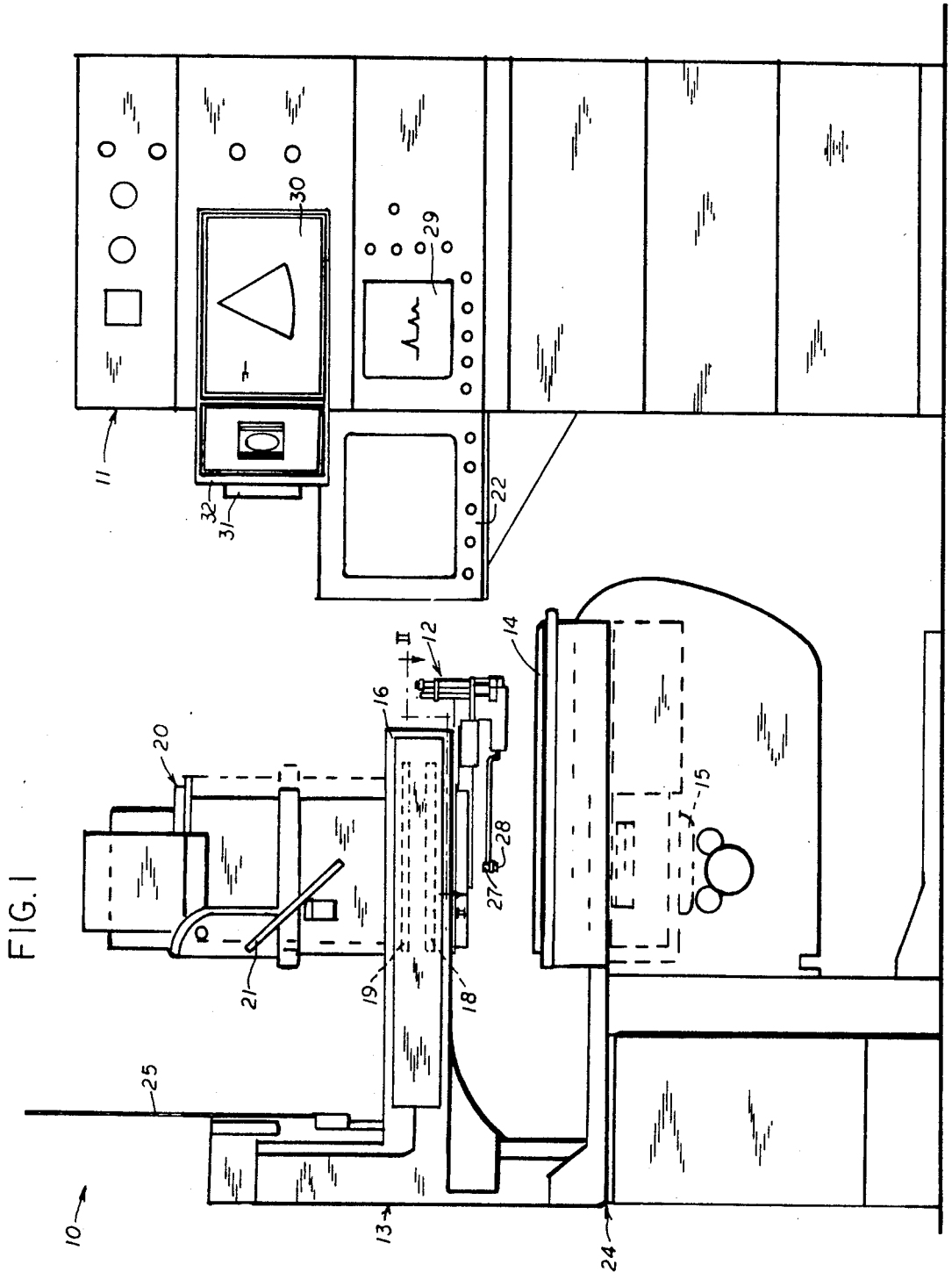
FIG. 1 is a side elevational view of a medical diagnostic system constructed in accordance with the invention, including combined ultrasonic and X-ray fluoroscopic apparatus.
Figure 2:
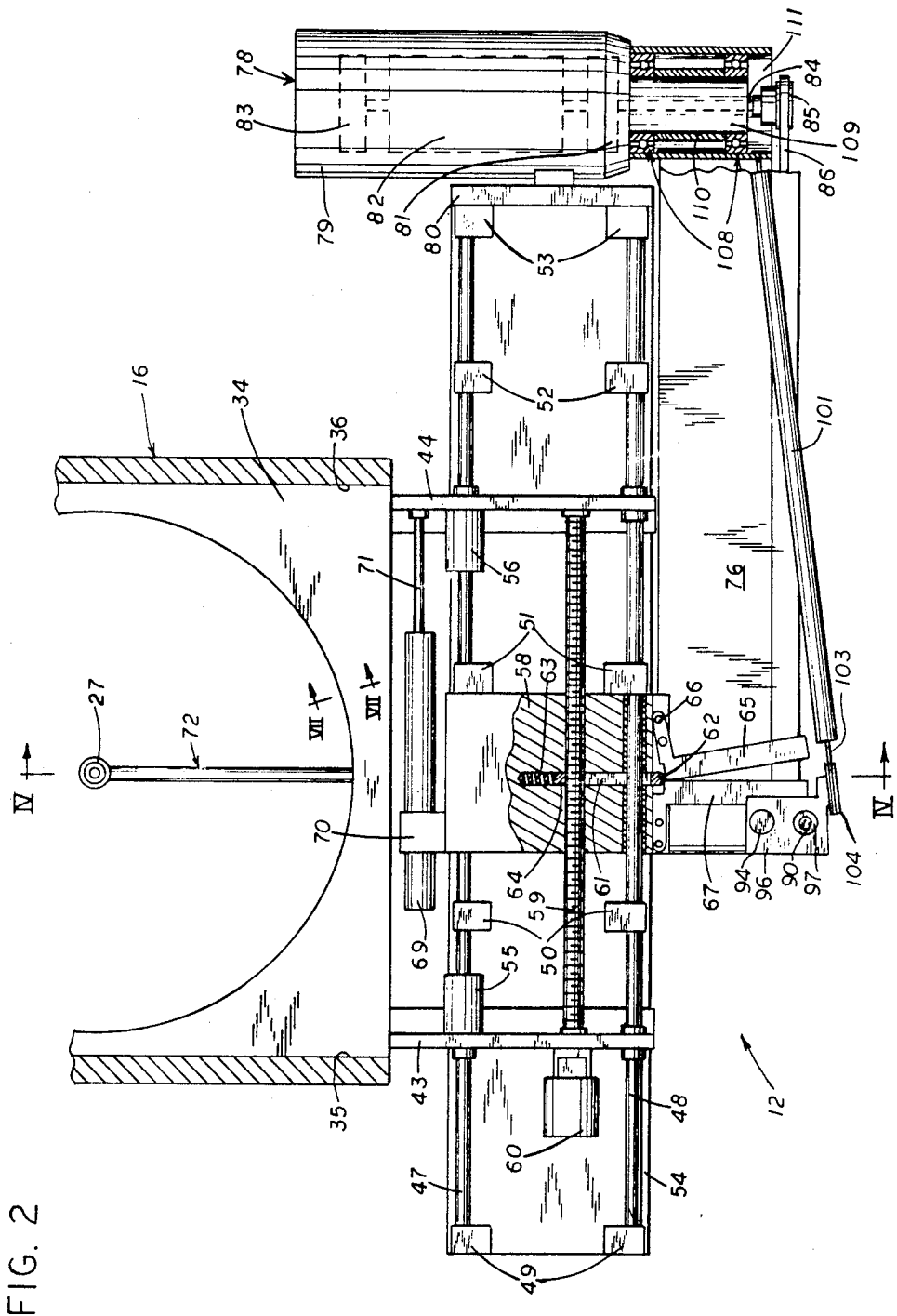
FIG. 2 is a sectional view, on an enlarged scale, taken substantially along line II–II of FIG. 1 and constituting a plan view of an ultrasonic probe assembly constructed according to the principles of this invention.

Reference numeral 10 generally designates a medical diagnostic system constructed in accordance with the principles of this invention. The illustrated system 10 is constructed by adding ultrasonic apparatus including a control and indicating units 11 and an ultrasonic probe assembly 12 to X-ray fluoroscopic apparatus 13 of a type known in the art.

The invention is particularly concerned with the construction of the probe assembly 12 but it is first noted that the X-ray fluoroscopic apparatus 13 comprises an examination table 14 for supporting a patient, and X-ray tube 15 supported within the table 14 and X-ray receiving means on a carrier 16 above the table 14, movable to a position over the portion of the patient's body to be examined.

Three different selectively usable X-ray receiving means are supported by the carrier 16. In particular, a cassette tray 18 is provided for holding a film-carrying cassette and is supported by suitable rollers for movement from a rearward inoperative position to a forward operative position over the portion of the body to be examined. In addition, a fluoroscopic screen 19 is supported by means of suitable rollers for movement from a rearward inoperative position to a forward operative position over the portion of the body to be examined. An image is then produced on the screen 19 in the form of a shadow field pattern of X-ray transmitted through the portion of the body being examined. During such examination, the X-rays must be of low intensity, to avoid damage to the patient, and the room is usually darkened when using the screen 19.

A third X-ray receiving means is provided in the form of an image amplifier unit 20 which permits a clear image to be obtained with X-rays of much lower intensity. The image amplifier unit 20 is also supported by suitable rollers for movement from a rearward inoperative position to a forward operative position over the portion of the body to be examined. The image amplifier unit 20 operates to project an image to a mirror 21 to be viewed by the examining physician, standing in front of the apparatus. The image amplifier unit 20 may also include a television camera connected to a monitor 22 which is preferably located on or adjacent the ultrasonic control and indicating unit 11, so that the examining physician can readily compare the fluoroscopic image with the ultrasonic indications.

The X-ray fluoroscopic apparatus 13 further includes a frame structure 24 on which the table 14 and carrier 16 are supported, the structure being preferably arranged so that both the X-ray tube 15 and the carrier 16 are movable longitudinally to facilitate accurate location of the X-ray transmitting and receiving means relative to the body to be examined. To carry part of the weight of the carrier 16, a cable 25 may be connected thereto and to an overhead support structure of known construction, not shown.

Although the table 14 is illustrated in a horizontal position in the drawing, the support from the frame structure 24 is preferably such that the table 14 may also be disposed in a vertical position so that the patient can stand between the table surface and the carrier 16.

It will be understood that the X-ray fluoroscopic apparatus 13 as thus far described has a construction which is known in the art and, accordingly, the details thereof are not shown and described in detail.

The transducer assembly 12 comprises a transducer 27 having an end face 28 arranged to be acoustically coupled to the patient's body for a correlated examination of the same portion of the body tested by the X-ray means. Although transducer 27 may transmit and receive ultrasonic waves through a coupling liquid, the end face 28 is preferably directly engaged with the skin of the patient's body using a suitable coupling fluid. It is noted that with the combination of X-ray and ultrasonic testing it is possible to obtain much more complete information as to the internal bodily structure since X-rays and ultrasonic waves have different transmission characteristics and ultrasonic waves are affected by interfaces within the body, where two adjoining regions have different characteristics with respect to the velocity of transmission of sonic waves. With the illustrated apparatus, the transducer 27 is positioned between the X-ray receiving means and the body to produce a shadow in the shadow field pattern of the X-ray image and it is thus possible to determine the exact location of the transducer, to provide very important information for diagnostic purposes.

Although through-transmission testing might be employed, a pulse-echo operation is preferably employed with the transducer 27 being used for both transmitting and receiving. In the pulse-echo operation, a pulse is periodically generated by circuitry within the unit 11 and is applied to the transducer 27 to cause it to transmit a burst of ultrasonic waves into the body. The burst of ultrasonic waves is partially reflected by interfaces within the body to return to the transducer 27 and to generate echo signals which are amplified within the unit 11 and are applied to indicating means thereof.

In particular, the illustrated unit 11 comprises an "A-scan" indicator in the form of a cathode ray tube having a face or screen 29. A spot of light produced on the screen 29 is deflected horizontally by a sawtooth wave synchronized with the pulsing of the transducer, while received echo signals are used to deflect the spot in a vertical direction, to produce "pips" on the screen 29. The positions of such pips, measured from the left side of the screen 29, are measures of the depth within the body of the interfaces producing the echo signals. In addition, a "B-scan" operation is employed to produce a cross-sectional pattern on the face or screen 30 of another cathode ray tube in the unit 11. To produce the cross-sectional pattern, a spot on the screen 30 is deflected in synchronism with the pulsing of the transducer to produce a trace on the screen, preferably starting adjacent the upper edge of the screen and moving downwardly, while the position of the trace is moved in a transverse direction to effect a scanning movement, preferably horizontally, in synchronism with a scanning movement of the ultrasonic beam produced by the transducer 27. The intensity of the spot meanwhile, is varied in response to echo signals received from the transducer 27. A camera 31 mounted on a door 32 is usable for recording the image produced on the screen 30 at a particular time, the door being shown open in FIG. 1, to permit viewing of the screen 30.

In the illustrated system, the transducer 27 is supported in a manner such as to permit two types of scanning movements, alone or in combination. In particular, the transducer 27 is so supported as to permit translational scanning movement in the form of reciprocable movement in a plane generally parallel to the surface portion of the patient's body, the plane being horizontal in the illustrated arrangement. During such translational scanning movement, a corresponding movement of the trace on the screen 30 is then produced.

In addition, the transducer 27 is supported for oscillatory movement about a certain axis which is preferably in approximate alignment with the end face 28 of the transducer and generally transverse to the direction of the translational movement. A corresponding sweeping oscillatory movement of the trace on the screen 30 is produced, preferably about a point adjacent the upper edge thereof. With this arrangement, a sector scan is produced which is highly advantageous, particularly in that the scanning can be accomplished with the transducer end face 28 directly in engagement with the surface of the body.

In accordance with this invention, the transducer 27 is freely movable in a direction generally transverse to the surface of the patient's body. With this feature, it is possible to maintain the end face 28 in contact with the skin of the patient's body to obtain highly effective and efficient acoustic coupling, while adjusting the position of the transducer and also while moving the transducer over the surface. A further advantage is that a pressure can be maintained between the end face 28 and the skin of the patient's body sufficient to obtain optimum acoustic coupling, but with minimum discomfort to the patient.

The oscillatory scanning movement can be effected at a rapid rate and with such movement being effected at a rate of at least fifteen scanning movements per second, indications of moving reflecting interfaces, such as interfaces within the heart for example, can be produced without flicker. At the same time, the transducer can be moved along the body, with the free support arrangement of this invention.

The assembly 12 comprises a mounting plate 34 having opposite side edge portions disposed in tracks or slots 35 and 36 in opposite inside sidewall portions of the carrier 16. Slots such as the slots 35 and 36 are provided in almost all commercially available X-ray fluoroscopic systems of the type illustrated, for the purpose of providing guideways for a palpation diaphragm. Accordingly, the ultrasonic apparatus can be readily applied to existing X-ray fluoroscopic systems.

A ring 37 is secured to the plate 34 at the edge of a large circular opening 38 in the plate 34. As shown in FIG. 7, the ring 37 has a lower portion 39 of reduced external diameter which extends within an upper end portion of a ring 40 rotatably supported thereon. To control friction, a bearing strip 41 which is preferably of Teflon is disposed in an internal groove of the ring 40 while a clamping ring 42 is fixed on the ring 37 and is arranged for adjustable axial movement to control the degree of pressure between the bearing strip 41 and the ring 40. Preferably, the ring 42 is secured to the ring 37 by means of screws 42a having shank portions 42b threaded into the ring 42, which may be loosened or tightened to control the pressure exerted on the bearing strip 41.

A pair of supports 43 and 44 are secured to the ring 40 and project in parallel relation therefrom. A rigidifying crossbar 45 may preferably extend between the supports 43 and 44, shown in FIG. 4. The supports 43 and 44 support a pair of rods 47 and 48 which extend in parallel relation, transverse to the supports 43 and 44 and which are secured by means of a series of pairs of blocks 49—53 to an elongated plate 54. The rods 47 and 48 are slidable through the supports 43 and 44 so that the plate 54 is moved horizontally, when the fluoroscopic apparatus is positioned as illustrated. To limit such movement of the plate 54, a rubber bumper 55 is disposed on the rod 47 between the support 43 and the block 50 and a similar bumper 56 is secured on the rod 47 between the support 44 and the block 51.

A control block 58 is supported for sliding movement on the rods 47 and 48 between the blocks 50 and 51 and is arranged to control movement of the transducer 27 in a direction parallel to the rods 47 and 48, as will appear.

To control movement of the control block 58, a lead screw 59 is journaled by the supports 43 and 44 and extends through the block 58, in parallel relation to the rods 47 and 48. The lead screw 59 may be rotated by hand or by a suitable control motor 60.

The control block 58 is releasably engageable with the lead screw 59 so that when desired, it may be freely moved along the rods 47 and 48. In particular, the lead screw 59 extends through a slot 61 in a plunger 62 which is disposed in a central opening of the block 58. The plunger 62 is urged outwardly by a coiled compression spring 63 to engage a threaded inner end portion 64 of the plunger 62 with the lead screw 59. To move the plunger 62 inwardly and thus disengage the threaded portion 64 from the lead screw 59, a L-shaped handle member 65 is pivoted on a pin 66 and is arranged to engage the outer end of the plunger 62. A second L-shaped handle member 67 may be secured to the block 58 adjacent the handle member 65 so that the operator can grasp the handle members 65 and 67 and exert a squeezing action to pivot the handle member 65 and to release the portion 64 from the lead screw 59 and to permit free movement of the block 58.

To correlate indications produced on the screen 30 with movement of the block 58 along the support rods 47 and 48, a linear potentiometer unit 69 is carried by a block 70 secured to the block 58 and has an actuating rod 71 extending in parallel relation to the rods 47 and 48 and having an end connected to the support 44.

To support and oscillate the transducer 27, a support arm or shaft 72 is provided which has an end portion 73 on an axis in approximate alignment with the end face of the transducer 27 and which has an offset portion 74 spaced away from the axis of the end portion 73, to provide a clearance such as to facilitate engagement of the end face 28 with a desired portion of the patient's body. A clamp ring 75 is formed integrally at the end of the offset portion 74 to receive and support the transducer 27.

The shaft end portion 73 is supported by bearing means within one end of an elongated support 76, the other end of the support 76 being journaled on a drive unit 78, for pivotal movement about an axis in parallel relation to the axis of the shaft end portion 73. The unit 78 includes a generally cylindrical housing 79 which is secured to a plate 80, the plate 80 being secured to the blocks 53 and to one end of the plate 54. The unit 78 includes an electric motor 81, a resolver 82 and a potentiometer 83 having rotor structures which are directly connected to a shaft 84 rotatable on an axis in spaced parallel relation to the axis of the end portion 73 of the transducer support shaft 72. The shaft 84 carries a pulley 85 which is coupled through a belt 86 to a pulley which is coupled to the end portion 73 of the transducer support shaft 72, as shown in FIG. 5, and described hereinafter.

The end portion of the support 76 which journals the end portion 73 of the transducer support shaft 72 has a protecting shaft portion 88 coaxial with the shaft portion 73 and journaled in a block 89 which is secured to the end of a rod 90 which is supported for sliding movement in a sleeve 91. The sleeve 91 is supported on the outer end of a plate 92 the inner end of which is secured to the underside of the control block 58.

With this arrangement, the block 89 together with the end portion of the support 76 which journals the end portion 73 of the transducer support shaft 72 are freely movable in a vertical direction but are constrained against movement in a horizontal direction relative to the control block 58. During such vertical movement, the other end of the support 76 pivots on the unit 78 and the unit 78 is moved horizontally relative to the control block 58. Thus as viewed in FIG. 3, when the block 89 is moved downwardly, the unit 78 is moved to the left, the rods 47 and 48, blocks 49—53 and the plate 54 being movable with the unit 78.

To electrically sense the vertical position of the transducer 27, a linear potentiometer unit 94 is supported on the plate 92 adjacent the sleeve 91 and has an actuating rod 95 connected to the block 89. Additional support for the potentiometer unit 94 is provided by means of a plate 96, secured to the upper end of the sleeve 91. To limit downward movement of the block 89, a stop member 97 is secured to the upper end of the rod 90 and is engageable with a rubber bumper 98 disposed on the rod 90 above the plate 96. To limit upward movement of the block 89, a rubber bumper 99 is disposed on the rod 90 above the block 89, to engage the underside of the plate 92.

In accordance with an important feature of the invention, counterbalance means are provided to minimize the force required to move the transducer 27 upwardly. In particular, a coiled tension spring 100, disposed in a tubular housing member 101, is connected through a link 102 to the support 76 adjacent the unit 78, with the other end of the spring 100 being connected to one end of a flexible cord 103. The cord 103 is entrained over a pulley 104 which is journaled on the plate 96 and extends downwardly for connection to the block 89. Preferably, the cord 103 has a looped end 105 adapted to be hooked onto a pin 106 projecting downwardly from the block 89, so that the cord 103 can be released from the block 89 when the counterbalance force is not required, as when the assembly is shifted 90° from the illustrated position, with the transducer 27 being then movable horizontally.

To journal the support 76 on the unit 78, a pair of ball bearing assemblies 108 are disposed on a reduced diameter portion 109 on the housing 79 of the unit 78, the bearing assemblies 108 being separated by a spacer sleeve 110. The ball bearing assemblies 108 are disposed within a generally cylindrical portion 111 at the end of the support 76.

Referring now to FIG. 5, the end portion of the transducer support shaft 72 extends within a hollow sleeve 112, a notch being provided in the end of the shaft portion 73 to receive a cross pin 113 which prevents rotation of the shaft portion 73 relative to the sleeve 112. One end of the sleeve 112 is journaled by means of a ball bearing assembly 114 within one end of a sleeve portion 115 of the support 76. An integral solid extension 116 of the sleeve 112 is journaled within the opposite end of the sleeve portion 115 by means of a second ball bearing assembly 117. The solid portion 116 carries a pulley 118 about which the belt 86 is entrained. The pulley 118 has the same effective diameter as the pulley 85 and, preferably, both pulleys have teeth meshed with teeth on the inside of the belt 86, to insure that the angular position of the transducer support shaft 72 always corresponds accurately to the angular position of the rotor shaft 84 of the unit 78. It will be understood that the belt 86 may be in the form of a chain and the pulleys 85 and 118 may be in the form of sprockets.

The terminal end part of the solid shaft portion 116 forms the shaft portion 88 which is journaled within the block 89 by a ball bearing assembly 120.

FIG. 6 is a schematic block diagram showing a system for controlling oscillatory movement of the transducer 27, for energizing the transducer 27 and for producing indications on the screens 29 and 30 in accordance with movements of the transducer 27.

The transducer 27 is energized from a pulser 124 which has an input terminal 125 connected to a terminal 126 on a terminal board or jack of a unit 128. Unit 128 includes a cathode ray tube having the screen 29 for producing the A-scan indication, and also includes timing and sweep generating circuitry of a type conventional in the oscilloscope art. Such circuitry generates a timing signal at the terminal 126 which is applied to the input terminal 125 of the pulser 124 to cause the transducer 27 to emanate a burst of ultrasonic waves. Echo signals generated by the transducer 27 are applied to the input of an amplifier 130 having an output terminal 131 connected to a terminal 132 of the unit 128, to be applied through amplifier circuits thereof to the vertical deflection plates, and to produce pips on the screen 29 in response to such echo signals.

The output terminal 131 of the amplifier 130 is also connected to an input terminal 133 of a mixer 134 having an output terminal 135 connected to an input terminal 136 of a video amplifier 137 having an output terminal 138 connected to a terminal 139 of a terminal board or jack of a unit 140. Unit 140 includes a cathode ray tube having the above-described screen 30, and also includes conventional circuitry for applying voltages to the cathode ray tube to impinge an electron beam on the screen, as well as deflection circuitry for energizing horizontal and vertical deflection plates or coils. Terminal 139 is connected either directly or through an amplifier in the unit 140 to the grid of the cathode ray tube therein to intensify the electron beam and brighten the spot in response to echo signals produced by the transducer 27.

To controllably oscillate the transducer 27, the motor 81 and the potentiometer 83 are connected to terminals of a board or jack 142 of a control unit 144 which, although having a number of desirable and advantageous features, forms no part of the present invention, and is therefore not illustrated or described in detail. It may be noted, however, that the unit 144 includes an adjustable speed control knob 145, an angle control knob 146 which controls the angle of oscillatory movement, and an attitude control knob 147 which controls the mean angle of the oscillatory movement.

As above indicated, the resolver 82 is effective to translate angular movement of the shaft 84 into electrical signals for correlating indications on the screen 30 with the oscillation of the transducer support shaft 72. In particular, the resolver 82 includes a stator coil 150 and a pair of rotor coils 151 and 152 located at right angles to each other and inductively coupled to the stator coil 150, to generate signals having sine and cosine functions of a signal applied to the stator coil 150.

Stator coil 150 is connected to an output terminal 153 of an amplifier 154 having an input terminal 155 connected to a terminal 156 of the unit 128. An internal sweep circuit of the unit 128 operates to generate a sawtooth signal at the terminal 156 which is amplified by the amplifier 154 and applied to the stator coil 150. The rotor coils 151 and 152 then develop corresponding sawtooth signals, having amplitudes which are sine and cosine functions of the angular position of the shaft 84.

Rotor coils 151 and 152 are respectively coupled to the input terminals 157 and 158 of a keyed clamp circuit 160 having a pair of output terminals 161 and 162 connected to input terminals 163 and 164 of a cathode follower circuit 166 having output terminals 167 and 168 connected to terminals 169 and 170 of the unit 140. Terminals 169 and 170 are connected directly or through amplifier circuits in the unit 140 to the horizontal and vertical deflection plates or coils of the cathode ray tube therein. In the system as illustrated, the terminal 169 is connected to the horizontal deflection circuit and is controlled from the signal developed by coil 151, while terminal 170 is connected to the vertical deflection circuit and is controlled by the signal from coil 152.

The system may be operated in a manner such that with the axis of the transducer 27 in a vertical position, the coil 151 is at right angles to the stator coil 150, so that no signal is applied to the horizontal deflection input terminal 169, while the coil 152 is aligned with the stator coil 150 to generate a maximum signal which is applied to the vertical deflection input terminal 170. A vertical trace is then developed on the screen 30 starting at an apex thereof and moving downwardly under control of the sawtooth sweep signal.

With the transducer 27 tilted slightly away from its vertical position, a signal is developed by the rotor coil 151 which is applied to the keyed clamp circuit 160 and the cathode follower 166 to the horizontal deflection input terminal 169, to thereby cause the sawtooth horizontal deflection signal of small amplitude to be applied along with the larger amplitude sawtooth vertical deflection signal. The trace then moves angularly downwardly and either to the left or right depending upon the direction of tilt of the transducer 27 from its vertical position, and with further movement away from the vertical position, the amplitude of the horizontal deflection signal is increased, while the amplitude of the vertical deflection signal is decreased. Accordingly, the position of the trace on the screen 30 accurately corresponds to the angular position of the transducer 27.

When the transducer 27 is oscillated, the trace on the screen 30 is caused to sweep through a certain arc about which is preferably adjacent the upper end of the screen 30 when the transducer 27 is in its uppermost position, to thereby produce a sector scan indication such as diagrammatically illustrated in FIG. 6.

The keyed clamp circuit 160 operates to fix the signal level at the output terminals 161 and 162 thereof during time intervals between the applied sawtooth signals. To control operation of the keyed clamp circuit 160, input terminals 171 and 172 thereof are connected to output terminals 173 and 174 of a clamp driver circuit 176 having input terminals 177 and 178 connected to output terminals 179 and 180 of a phase splitter circuit 182 having an input terminal 183 connected to an output terminal 184 of the unit 128. The timing and sweep circuitry of the unit 128 generates an unblanking pulse at the terminal 184 which is applied to the input terminal 183 of the phase splitter 182. The phase splitter 182 then operates to apply squarewave signals of opposite polarity to the clamp driver circuit 176 which in turn operates the keyed clamp circuit 160 to fix the levels during time intervals between the sawtooth signals.

The levels at which the signals are fixed are controllable to control the position of the trace or sector scan produced on the screen 30. In particular, the linear potentiometers 69 and 94 are connected to terminals 187 and 188 of the keyed clamp circuit 160 and terminals 189 and 190 of the cathode follower 166. As above described, the potentiometer 69 is controlled by horizontal movement of the control block 58, and it operates to shift the base level of the horizontal deflection signal, so that the trace or the sector scan indication is moved horizontally on the screen 30 in response to movement of the control block 58. Similarly, the potentiometer 94 is controlled by vertical movement of the block 89 and it operates to shift the base level of the vertical deflection signal, so that the trace or the sector scan indication is moved vertically on the screen 30 in response to movement of the block 89.

It is noted at this point that although the horizontal and vertical relationship of the movements and indications is obtained with the system as illustrated, the movements can be effected in any direction, and the terms horizontal and vertical are used herein only for ease and clarity of description, and are not to be construed as limitations.

The mixer 134 has an input terminal 191 to which the unblanking signal from terminal 184 is applied. An additional input terminal of the mixer 134 is connected to the output of a waveform generator 192 having an input connected to the terminal 126 of unit 128. Waveform generator 192 is of a type known in the radar art and applies a signal to increase the amplification of echo signals in proportion to the distance from the transducer so as to compensate for attenuation of signals and also to compensate for the fact that with the sector scan the separation of trace lines increases in proportion to the distance from the transducer.

As noted above, a very important advantage of the invention resides in the fact that the scanning movement can be effected at a rapid rate such as to produce a visible indication of moving reflecting interfaces without flicker. The freedom of movement of the transducer 27 in a vertical direction, obtained with the system of this invention, makes it possible to employ a fast scan while the transducer end face 28 is in effective contact with the patient's skin. In the illustrated system, the oscillations of the transducer back and forth should be effected at the rate of at least 7.5 complete oscillations per second, to produce 15 scans per second, and preferably the oscillations are effected at the rate of at least 10 oscillations per second to produce 20 scans per second. The oscillations are most preferably effected at an even higher rate to avoid distortions and obtain an accurate indication of distance. The fast scan feature is very important in permitting interpretation of an indication while it is being produced on the screen 30 and is also important when the camera 31 is used for recording the indication produced at a particular time in avoiding a blurring effect which is produced with a slow scan operation.

The pulsing rate, i.e. the repetition rate of the sawtooth signals applied to the resolver stator coil 150 should be much higher than the scanning rate, preferably on the order of 500 per second, in order to avoid distortions of the pattern in the screen 30 and in order to obtain the highest possible accuracy.

It will be understood that modifications and variations may be effected without departing from the spirit and scope of the novel concepts of this invention.

I claim:
1. In a medical ultrasonic system for the examination of the interior of a patient's body, a test assembly including first support means arranged for positioning in generally fixed relation to the patient's body, second support means supported on said first support means for movement in a plane generally parallel to a surface portion of the patient's body, probe means arranged to be acoustically coupled to said surface portion of the patient's body, third support means supporting said probe means on said first and second support means for substantially free movement in a direction generally transverse to said plane to facilitate engagement of said probe means with said surface portion of the patient's body during movement of said second support means in said plane while accommodating variations in the spacing between said surface portion of the patient's body and the plane, indicating means, and coupling means electrically coupling said indicating means to said test assembly, said system being arranged for use with X-ray apparatus including X-ray generating and receiving means and a pair of support means for respectively supporting said X-ray generating and receiving means on opposite sides of the patient's body for passage of X-rays through a portion of the patient's body to said receiving means with one of said support means having a palpation diaphragm guideway therein, said first support means including a support plate arranged for disposition in said guideway.

2. In a medical ultrasonic system as defined in claim 1, said support plate having a central opening, and said probe means being supported in alignment with said opening.

3. In a medical ultrasonic system as defined in claim 2, said third support means including bearing means supporting said probe means for oscillatory movement about an axis generally parallel to and in proximity to said surface portion of the patient's body, a stator structure, a rotor structure journaled within said stator structure, and means coupling said rotor structure to said probe means, said stator and rotor structures being positioned outside said support plate.